United States Patent Office 2,789,936
Patented Apr. 23, 1957

2,789,936

GASTROPODICIDAL COMPOSITION AND METHOD OF USING SAME

Richard Lloyd Davies, Newtown Square, Pa., assignor to The Pennsylvania Salt Manufacturing Company, Philadelphia, Pa., a corporation of Pennsylvania No Drawing. Application December 9, 1953, Serial No. 397,274

6 Claims. (Cl. 167—16)

This invention relates to a chemical composition which is useful in the killing of Mollusca, specifically the killing of snails.

Schistosomiasis is rated by many scientists as the world's most important health problem, even though it is not universal in its distribution. An estimated 110,000,000 people in the world suffer from the disease, which is caused by a parasitic worm or fluke called schistosome.

There are several species of the parasite, three of which are known to attack human beings, damaging such organs as the liver, bladder, lungs and intestines. Badly infected people become too weak and too sick to work and may suffer from the disease from three months to two years, with death being the eventual result.

In some areas of Egypt, 90% of the population is afflicted with schistosomiasis, and the disease is also prevalent in Japan, Brazil, Puerto Rico, Venezuela, the Philippines, Formosa and China. No completely effective treatment is known. The disease is caused when the body is invaded by parasitic worms or schistosomes which enter through the skin and invade the veins of the abdominal cavity. The blood vessels are then injured by the eggs laid by the female worm, which possess tiny sharp spines.

The parasite which causes schistosomiasis has a peculiar life cycle in that it cannot pass directly from one human being to another. The eggs of the female worm leave the human body and hatch when they reach fresh water. The newly hatched worms must develop within the body of a particular type of snail, and a suitable snail host must be found quickly or the worm will die. When the worm reaches a suitable snail, it begins to multiply and develop. After a few weeks in the snail, large numbers of the worms migrate and swim about in fresh water until contact with a human is made. They then quickly penetrate the skin and find their way to the blood stream, mature, and start the cycle again.

Although copper sulfate and sodium pentachlorophenate, as well as copper pentachlorophenate, have each been reported to have molluscacidal action, the use of these compounds has not resulted in adequate control of schistosomiasis. Reasons for this may be failure to apply adequate concentrations of the chemicals, and the ability of organic materials and plant life in treated waters to bind the available copper and pentachlorophenate ions. It has been established (Dobrovolny and Haskins: "Effects of soils and sunlight on dilute concentrations of sodium pentachlorophenate," Science, vol. 117, pp. 501 and 502, May 8, 1953) that soil is one of the factors that influence the efficacy of molluscacides, as indicated by observations that the mortality of snails in the presence of sodium pentachlorophenate was usually lower in test plots having a muddy bottom. These observations were further supported by tests showing that concentrations of the pentachlorophenate group of molluscacides decreased most rapidly in test plots having a thick underlying layer of soft mud. The need for molluscacides of greater efficacy has been, therefore, increasingly recognized.

In accordance with the present invention, it has been found that when copper ions and pentachlorophenate ions are maintained within a certain ratio in an aqueous medium, a synergistic effect results, and a solution is thereby produced which possesses molluscacidal properties to a very high degree.

In preparing the molluscacides of the invention, any source of copper and pentachlorophenate ions may be employed, and among the soluble copper salts which may be used are copper acetate, copper sulfate, copper nitrate, copper lactate, copper formate, copper chloride, copper ammonium sulfate and copper ammonium chloride. While sodium pentachlorophenate is preferred as a synergist, the other alkali metal pentachlorophenates may also be employed, such as the potassium, lithium, rubidium, cesium and francium salts.

Relatively insoluble salts may also be used with the result that copper ions and pentachlorophenate ions pass into solution slowly over a prolonged period. For example, I may use copper carbonate and calcium pentachlorophenate in quantities which will maintain the desired synergistic proportions of copper ions and pentachlorophenate ions. I have found a very desirable formulation comprises copper sulfate, sodium pentachlorophenate, and tribasic copper sulfate in proportions which provide and maintain the proper ratio of ions to obtain the desired synergistic effect.

The synergistic molluscacidal solutions of the invention should contain at least about 0.3 part per million of total copper and pentachlorophenate ions, these ions being in the ratio of about 40 to about 85% by weight copper ions to about 60 to about 15% by weight pentachlorophenate ions. This is in marked contrast to the proportion in which these ions are present in copper pentachlorophenate, namely, about 10% by weight copper and 90% by weight pentachlorophenate. Of course the quantities by weight of copper and pentachlorophenate salts added to the aqueous medium to form the molluscacidal solutions of the invention will vary in accordance with the molecular weights of the particular salts employed. The beneficial effects of the invention are obtained as long as the ratio by weight of copper ions to pentachlorophenate ions is maintained within the prescribed range.

Snails may be controlled, using the molluscacidal composition of the invention, by any of the methods commonly employed, such as forming a solution in still pools, such as rice paddies and the like, of sufficiently high concentration to kill the snails present, or by adding the composition to a film which spreads over the surface of still pools and which may have the property of sinking to the bottom, if desired. Treatments whereby the chemicals are placed in bags, which are dragged through the water of rice paddies and irrigation ditches are not as effective as the other means commonly employed.

Where the water contains a high percentage of suspended matter, it is necessary to use more of the composition of the invention than in waters which are substantially free of such suspended matter, due to the property of the watter to absorb the effective ions. Thus, in waters containing a high percentage of suspended matter, at least about 0.6 part per million of total effective ions is required.

The invention will be further illustrated by reference to the following specific examples:

EXAMPLE 1

In all tests to determine the effect of pentachlorophenate ions as synergists for copper ions and the effects of the ions individually, the following procedure was employed. Dilution water—Chu 14 modified (see Journal of Ecology, vol. 30, No. 2, pages 284–325)—is prepared, aerated for at least 18 hours, and hardened to a total hardness of 200 parts per million, as $CaCO_3$, with $CaSO_4$, the pH being adjusted to 7.9. Tests are run in 250 ml. of solution in 400 ml. Pyrex beakers, or in 5 liter glass aquaria when larger volumes of solution are required. When colloid is desired, to simulate the effect of suspended matter, the colloid (24 grams/250 ml.) is placed in the test vessel prior to the addition of the test solution.

Snails are collected 24 hours prior to use and are acclimated to temperature ($28° \pm 1°$ C.) and dilution water during that period. They are not fed. They range in size from 9 to 13 mm. in diameter.

Each concentration is run in duplicate with 5 snails in each, a duplicate control being run with each battery of tests. Unless otherwise specified, the snails are subjected to the test solution for 24 hours and are then given a 48-hour recovery period in culture tank water (changed after 24 hours), after which they are checked for the number dead. The criterion for death is lack of response of the tentacles or foot to mechanical stimulation or to crushing of the shell. The snails are used only once in test solutions.

The snails employed, *Australorbis glabratus*, are described by Reeve, L. A. (continued by G. B. Sowerby), Conchologia Iconica, v. XX, London, 1878, as follows: "Shell sinistral, fulvous-horny, tumid, somewhat depressed, smooth; spire narrow, depressed; whorls narrowly raised above the suture; last broad sloped above; aperture large, lower margin produced, and lower disc hollowed in the middle."

Using the test procedure described above, the following determinations were made:

1. The mortality of snails in the presence of copper ions in distilled water;
2. The mortality of snails in the presence of pentachlorophenate ions in distilled water;
3. The mortality of snails in the presence of copper ions in water containing kaolin;
4. The mortality of snails in the presence of pentachlorophenate ions in water containing kaolin.

These results are tabulated in Tables I to IV below, the concentrations of ions in parts per million, and the percent mortality at given concentrations being listed. The copper ions and pentachlorophenate ions were derived, in each case, from copper sulfate and sodium pentachlorophenate, respectively.

*Table I*

MORTALITY OF SNAILS IN THE PRESENCE OF COPPER IONS IN DISTILLED WATER

| Concentration Cu ions (p. p. m.) | Percent Mortality, 24-Hour Tests |
|---|---|
| 0.052 | 10 |
| 0.076 | 20 |
| 0.100 | 30 |
| 0.125 | 40 |
| 0.151 | 50 |
| 0.190 | 60 |
| 0.240 | 70 |
| 0.320 | 80 |
| 0.465 | 90 |
| 0.500 | 100 |

*Table II*

MORTALITY OF SNAILS IN THE PRESENCE OF PENTACHLOROPHENATE IONS IN DISTILLED WATER

| Concentration Pentachlorophenate Ions (p. p. m.) | Percent Mortality, 24-Hour Tests |
|---|---|
| 0.57 | 10 |
| 0.65 | 20 |
| 0.70 | 30 |
| 0.76 | 40 |
| 0.82 | 50 |
| 0.87 | 60 |
| 0.94 | 70 |
| 1.00 | 80 |
| 1.15 | 90 |
| 1.80 | 100 |

*Table III*

MORTALITY OF SNAILS IN THE PRESENCE OF COPPER IONS IN WATER CONTAINING KAOLIN

| Concentration Cu ions (p. p. m.) | Percent Mortality, 24-Hour Tests |
|---|---|
| 2.9 | 10 |
| 4.0 | 20 |
| 5.0 | 30 |
| 6.2 | 40 |
| 7.4 | 50 |
| 8.8 | 60 |

*Table IV*

MORTALITY OF SNAILS IN THE PRESENCE OF PENTACHLOROPHENATE IONS IN WATER CONTAINING KAOLIN

| Concentration Pentachlorophenate Ions (p. p. m.) | Percent Mortality, 24-Hour Tests |
|---|---|
| 0.31 | 10 |
| 0.47 | 20 |
| 0.63 | 30 |
| 0.81 | 40 |
| 1.00 | 50 |
| 1.30 | 60 |
| 1.70 | 70 |
| 2.25 | 80 |
| 3.40 | 90 |
| 4.00 | 100 |

From the above data, straight-line curves may be plotted if desired on logarithmic probability paper, from which any intermediate values may be directly read. The concentrations sufficient to provide 100% mortality are taken from the test data and cannot be plotted on logarithmic probability paper.

EXAMPLE II

In order to show the synergism between mixtures of copper ions and pentachlorophenate ions in distilled water, various concentrations of copper ions and pentachlorophenate ions, derived from copper sulfate and sodium pentachlorophenate, respectively, were mixed and the calculated theoretical mortality was determined by adding to the copper concentration the copper equivalent of the pentachlorophenate concentration, the latter determined by reading from pentachlorophenate concentration in Table II to percent mortality (interpolating if necessary) and then reading from that percent mortality to copper concentration in Table I. Using the sum of actual copper concentration and copper equivalent of pentachlorophenate concentration, the calculated theoretical mortality was then found from Table I.

For example, in Table V below, the first value listed for copper concentration is 0.028 part per million, and the corresponding pentachlorophenate concentration is 0.6 part per million. By interpolating, in Table II above, a concentration of pentachlorophenate ions in distilled water of 0.6 part per million, a mortality of 13% is found. Taking this 13% value and interpolating in Table I above, an equivalent of pentachlorophenate ion to copper of 0.06 part per million is found. The total copper equivalent is then 0.028 plus 0.06, or 0.088 part per million. Then, interpolating the total copper equivalent, in Table I above, as concentration of total copper ions, results in a calculated mortality of 25%. In this case, since the actual mortality found by test was only 20%, it is evident that no synergism was present at these relative ion concentrations.

The data tabulated in Table V below were determined in the manner above described, and the mortality values, when plotted as a smooth curve, show high mortality, with marked synergism, in the range froom about 40% by weight copper and about 60% by weight pentachlorophenate ions to about 85% by weight copper and about 15% by weight pentachlorophenate ions.

*Table V*

MORTALITY OF SNAILS IN THE PRESENCE OF MIXTURES OF COPPER IONS AND PENTACHLOROPHENATE IONS IN DISTILLED WATER

|   | p. p. m. Cu | p. p. m. PCP | Percent Cu | Percent PCP | PCP equiv. to Cu | Total Cu equiv. | Calc. percent Mortality | Actual percent Mortality |
|---|---|---|---|---|---|---|---|---|
| (1) | 0.028 | 0.6 | 5.5 | 94.5 | 0.06 | 0.088 | 25 | 20 |
| (2) | 0.05 | 0.485 | 9.2 | 90.8 | 0.031 | 0.081 | 21 | 50 |
| (3) | 0.07 | 0.375 | 15.6 | 84.4 | 0.013 | 0.083 | 23 | 90 |
| (4) | 0.11 | 0.187 | 87.0 | 63.0 | 0 | 0.11 | 34 | 80 |
| (5) | 0.125 | 0.082 | 60.4 | 39.6 | 0 | 0.125 | 40 | 80 |
| (6) | 0.13 | 0.054 | 70.7 | 29.3 | 0 | 0.13 | 42 | 100 |
| (7) | 0.135 | 0.026 | 84.0 | 16.0 | 0 | 0.135 | 44 | 85 |
| (8) | 0.138 | 0.01 | 93.0 | 6.7 | 0 | 0.138 | 45 | 60 |
| (9) | 0.14 | 0 | 100.0 | 0 | 0 | 0.14 | 46 | 40 |

EXAMPLE III

Using the method above described, an interpolating in Tables III and IV above, the mortality of snails in the presence of mixtures of copper ions and pentachlorophenate ions in water containing kaolin, to simulate the presence of suspended matter, was determined. The quantity of kaolin employed was the same in all cases: 24 grams/250 mm. of solution. Synergism was found in the range of copper ions to pentachlorophenate ions above noted.

In the foregoing it is apparent that pentachlorophenate ions are very effective synergists for copper ions in molluscacidal compositions, these compositions being highly effective both in distilled water and in water containing suspended solid matter.

It will be obvious to those skilled in the art that many modifications may be made within the scope of the present invention without departing from the spirit thereof and the invention includes all such modifications.

I claim:

1. A chemical composition containing an ionizable water-soluble copper salt and an alkali metal pentachlorophenate in quantities to produce copper and pentachlorophenate ions in the ratio of about 40 to about 85 percent by weight copper ions to about 60 to about 15 percent by weight pentachlorophenate ions when ionized in aqueous solution.

2. The composition of claim 1 in which the copper salt is selected from the group consisting of copper acetate, copper sulfate, copper nitrate, copper lactate, copper formate, copper chloride, copper ammonium sulfate and copper ammonium chloride.

3. The composition of claim 1 in which the copper salt is copper sulfate.

4. The composition of claim 1 in which the alkali metal pentachlorophenate is sodium pentachlorophenate.

5. A process for killing Gastropoda which comprises immersing the Gastropoda in an aqueous medium containing copper and pentachlorophenate ions in the ratio of about 40 to about 85 percent by weight copper ions to about 60 to about 15 percent by weight pentachlorophenate ions.

6. An aqueous Gastropodal solution containing copper and pentachlorophenate ions in the ratio of about 40 to about 85 percent by weight copper ions to about 60 to about 15 percent by weight pentachlorophenate ions.

References Cited in the file of this patent

McMullen: American Journal of Tropical Medicine and Hygiene, July 1952, pp. 671–679.